(12) United States Patent
Guillarme et al.

(10) Patent No.: US 7,263,432 B2
(45) Date of Patent: Aug. 28, 2007

(54) METHOD AND DEVICE FOR DETECTING THE ELECTRICAL POSITION OF AN ELECTRICAL MACHINE ROTOR

(75) Inventors: Nicolas Guillarme, Meriel (FR); Stephane Sorel, Eragny sur Oise (FR)

(73) Assignee: Valeo Systemes de Controle Moteur, Cergy-Pontoise (FR)

( * ) Notice: Subject to any disclaimer, the term of this patent is extended or adjusted under 35 U.S.C. 154(b) by 87 days.

(21) Appl. No.: 10/500,060

(22) PCT Filed: Dec. 23, 2002

(86) PCT No.: PCT/FR02/04523
§ 371 (c)(1),
(2), (4) Date: Jun. 24, 2004

(87) PCT Pub. No.: WO03/060317
PCT Pub. Date: Jul. 24, 2003

(65) Prior Publication Data
US 2005/0080549 A1   Apr. 14, 2005

(30) Foreign Application Priority Data
Jan. 3, 2002   (FR) .................................. 02 00030

(51) Int. Cl.
*F02D 41/00*   (2006.01)
*H02K 23/52*   (2006.01)

(52) U.S. Cl. ........................................ 701/113; 290/31
(58) Field of Classification Search ................ 701/113, 701/103, 115; 73/116, 117.2, 117.3; 123/476, 123/478, 406.61, 406.62, 612, 613, 617
See application file for complete search history.

(56) References Cited

U.S. PATENT DOCUMENTS 5,461,293 A    10/1995  Rozman et al.
5,691,625 A *  11/1997  Kumar et al. .................. 322/20
6,681,173 B2 *  1/2004  Turner et al. ................ 701/113

FOREIGN PATENT DOCUMENTS

EP    0 952 335 A1    10/1999

* cited by examiner

*Primary Examiner*—Willis R. Wolfe
*Assistant Examiner*—Johnny H. Hoang
(74) *Attorney, Agent, or Firm*—Osha Liang LLP

(57) ABSTRACT

A method of detecting an angular position of a rotor of an electrical machine includes determining a rotor position for the electrical machine using data obtained from a first data source, determining a rotor position for the electrical machine using data obtained from a second data source, and switching between determining a rotor position using data obtained from the first data source and using data obtained from the second data source. A point at which switching occurs is different when a speed of rotation is increasing than when the speed of rotation is decreasing.

14 Claims, 1 Drawing Sheet

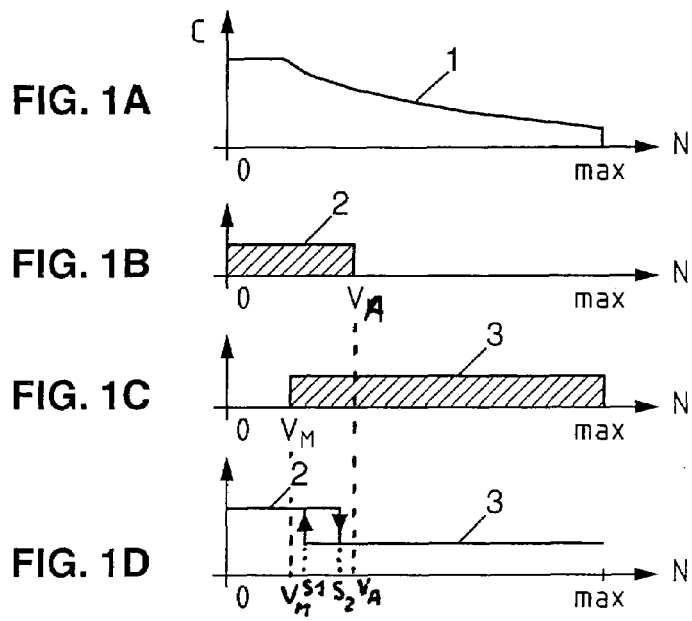
FIG. 1A
FIG. 1B
FIG. 1C
FIG. 1D
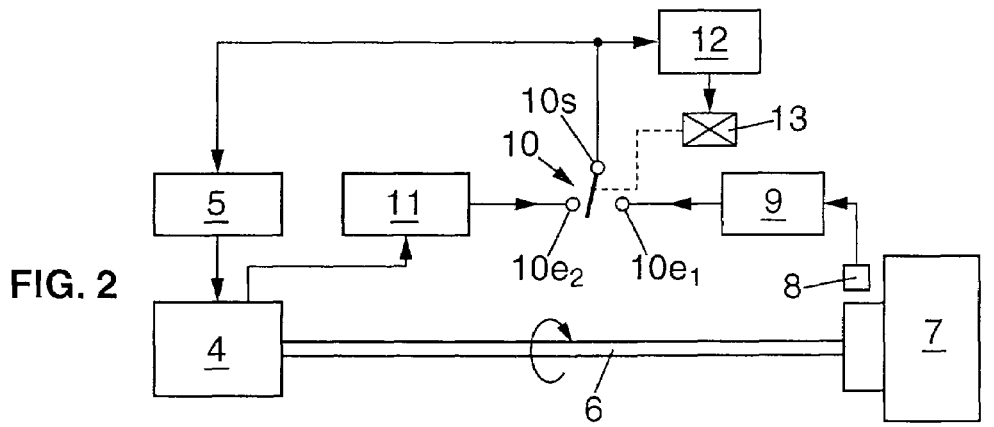
FIG. 2
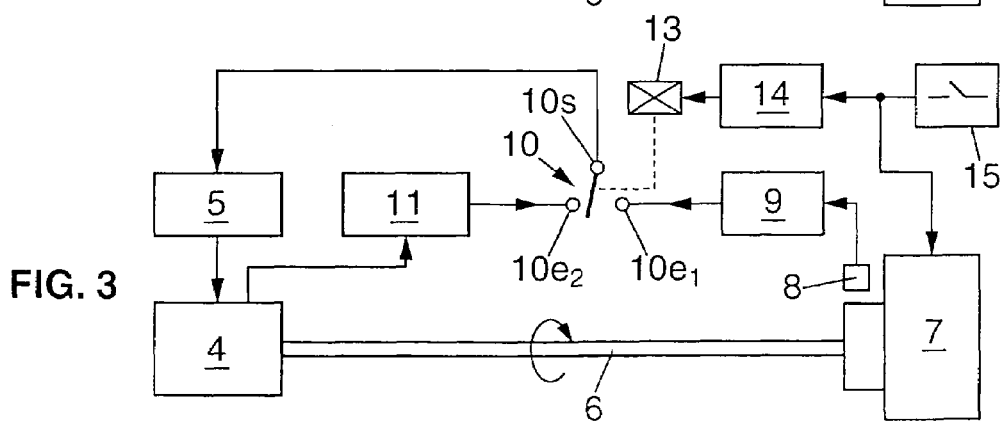
FIG. 3

METHOD AND DEVICE FOR DETECTING THE ELECTRICAL POSITION OF AN ELECTRICAL MACHINE ROTOR

The present invention relates to improvements made to the field of detecting the electrical position of the rotor of an electrical machine which is coupled in rotation without slip to an internal combustion engine fitted with a toothed-wheel sensor delivering a signal representative of the angular position of the engine for speeds of rotation that are greater than a first predetermined threshold.

The term "electrical machine" is used to mean a rotary electrical machine capable of operating either as an electricity generator if it is driven by an engine, or else as an electric motor if it is powered electrically, and its control means ensure it is appropriately excited in both modes of operation.

BACKGROUND OF THE INVENTION

Proper control of an electrical machine such as an alternator-starter, in particular a variable reluctance alternator-starter, requires that the electrical position of its rotor be known accurately. At present, knowledge of this position is obtained by a position-measuring device using a specific sensor, e.g. with a toothed wheel, that has a number of teeth equal to the number of poles of the rotor of the electrical machine in order to provide the required information over the entire range of speeds of rotation covered by the engine (from stationary (zero speed) to maximum speed) and over all ranges of variation in parameters that have an influence (temperature, voltage of on-board network, . . . ).

Nevertheless, those position-measuring devices which provide good performance and which, in themselves, give full satisfaction, are complex and expensive. In addition, they are mounted in physical association with the engine and transmission unit (in particular at the end of the clutch) together with the existing toothed-wheel sensor for controlling the engine. Although the volume of the specific sensor has been made very small (typically it presents a thickness of about 6 millimeters (mm)), it nevertheless remains that the sensor constitutes an impediment both for mounting the engine and transmission unit in a location where space is short, and for performing any adjustment and/or calibration operation. Furthermore, devices that are mounted in this way are too exposed (heat from the engine, dust, oil, . . . ), which can have an unfavorable influence on their operating conditions and on their lifetime.

There thus exists an urgent need for arrangements for detecting the position of the rotor of an electrical machine that are less expensive than present-day devices and that can be installed away from present mounting locations, in places where more space is available, and above all where they are less exposed to unfavorable conditions.

It should be observed at this point that the toothed-wheel sensor used for engine control and that can deliver an absolute value for the angular position of the crankshaft (a 60-2 toothed sensor in the worldwide standard) has a number of teeth that is not equal to the number of poles in the rotor of the electrical machine.

That sensor can therefore provide a reliable value for the angular position of the crankshaft only above some minimum value for speed of rotation, and in practice a speed of the order of 500 revolutions per minute (rpm).

Such a sensor therefore cannot be used for providing the desired information concerning the angular position of the crankshaft at speeds going from zero speed up to the minimum speed at which the sensor operates properly.

Unfortunately, specifically with an alternator-starter, knowledge of the angular position of the crank-shaft is needed in order to control the alternator-starter when starting the engine, i.e. at speeds that are low and beginning from zero speed.

OBJECT OF THE INVENTION

An object of the invention is thus to propose a method enabling the above-described drawbacks to be remedied in effective manner, making it possible to know reliably the angular position of the rotor of the electrical machine over the entire operating range of the engine starting from zero speed, and to do so under technical conditions that are relatively simple and inexpensive, with a configuration that is easier than in the past.

BRIEF DESCRIPTION OF THE INVENTION

For these purposes, in a first of its aspects, the invention provides a method of detecting the angular position of the rotor of an electrical machine which is coupled in rotation without slip to an internal combustion engine that is fitted with a sensor delivering a first signal representative of the angular position of the engine at speeds of rotation that are greater than a minimum measurement speed, in which method on the basis of at least one characteristic of the electrical machine, a second signal is generated that is representative of an estimated angular position of the rotor of the electrical machine for speeds of rotation that are less than a maximum estimation speed; and as a function of an estimated speed of rotation, there is delivered to means for controlling the electrical machine:

the second signal whenever the estimated speed of rotation is below a first threshold greater than or equal to the minimum measurement speed; or the first signal whenever the estimated speed of rotation is greater than a second threshold greater than or equal to the first threshold but less than or equal to the maximum estimation speed;

and a changeover from the second signal to the first signal, and vice versa, is performed at an estimated speed of rotation lying between the first threshold and the second threshold.

In an advantageous version of the invention, during an increase in the speed of rotation while the second signal is being delivered, a changeover from the second signal to the first signal is performed when the estimated speed of rotation reaches the second threshold, and, during a decrease in the speed of rotation while the first signal is being delivered, a changeover from the first signal to the second signal is performed when the estimated speed of rotation reaches the first threshold. Preferably, the second threshold is less than the idling speed of the internal combustion engine. Thus, while the internal combustion engine is idling, pointless changeover from the first signal to the second signal over the entire normal operating range of the engine is avoided, i.e. from idling speed up to the maximum speed of rotation of the engine.

According to other aspects of the invention, in order to cause changeover from one signal to the other, the estimated speed of rotation can be determined either on the basis of an electrical characteristic of the electrical machine, or by timer means that are engaged when the engine is started and that cause switchover to take place after a length of time has elapsed, which length of time is determined so that the speed can be assumed to lie between the first threshold and the second threshold.

In practice, the first threshold is, for example, about 500 rpm and the second thresholds is, for example, about 700 rpm.

By means of the dispositions of the invention, it is possible to detect the angular position of the rotor over its entire range of rotation (starting from zero speed) by implementing a toothed-wheel sensor that already exists for operating the internal combustion engine, together with a position estimator that is restricted to low speeds and, given that its performance is more restricted than that of prior art angular position estimators operating over the entire speed range of the engine, the position estimator constitutes technology that is simpler and thus represents a cost that is much lower. Such a position estimator can be implemented in the form of a calculator having inputs receiving the voltage and current information concerning the electrical machine and having an output delivering a signal representative of the angular position of its rotor, where such a calculator can be integrated in the control software of the electric motor.

BRIEF DESCRIPTION OF THE DRAWING

The invention will be better understood on reading the following detailed description in which reference is made to the accompanying drawing, in which:

FIGS. 1A to 1D are graphs illustrating the basis of the method in accordance with the invention;

FIG. 2 is a block diagram showing an embodiment of apparatus made in accordance with the invention; and FIG. 3 is a block diagram showing a variant of the FIG. 2 apparatus.

Reference is made initially to FIGS. 1A to 1D to explain the method in accordance with the invention.

DETAILED DESCRIPTION OF THE INVENTION

In FIG. 1A, curve 1 shows the torque/speed-of-rotation characteristic of an electrical machine such as an alternator-starter, in particular one having variable reluctance, between zero speed and a maximum speed of rotation.

In FIG. 1B, reference 2 shows the useful operating range of estimator means for estimating the angular position of the rotor of the electrical machine, where said means are of simplified design and are effective only in the low speed range, between zero speed and a maximum estimation speed $V_A$ (e.g. about 1000 rpm), above which the estimated position is considered as being no longer reliable.

In FIG. 1C, reference 3 shows the useful operating range of a toothed-wheel sensor or a top dead center (TDC) sensor present in an internal combustion engine for the purpose of controlling the engine. Such a sensor delivers an absolute value for the angular position of the crankshaft over the entire normal operating range of the engine between its idling speed and its maximum speed. In practice, the sensor delivers an indication that is reliable at speeds that are greater than some minimum measurement speed $V_M$ (e.g. 450 rpm) which is lower than the idling speed of the engine (e.g. about 750 rpm), and which is also well below the maximum estimation speed $V_A$ of the above-mentioned estimator means.

As shown in FIG. 1D, the method of the invention consists in using a first signal representative of an angular position measured by the toothed-wheel sensor while the estimated speed of rotation is greater than the maximum estimation speed $V_A$, and a second signal representative of an estimated angular position while the estimated speed of rotation is less than the minimum measurement speed $V_M$, and in switching over from the first to the second signal, or vice versa, in the interval lying between a first threshold S1 which is greater than the minimum measurement speed $V_M$, and a second threshold S2 which is greater than or equal to the first threshold S1 but less than or equal to the maximum estimation speed $V_A$.

In the preferred implementation shown, the second signal is used from a zero speed of rotation up to the speed of rotation reaching the second threshold S2, whereas while the speed of rotation is decreasing, the first signal is used until the speed of rotation reaches the first threshold S1. In addition, the second threshold S2 is less than or equal to the idling speed of the internal combustion engine. In practice, this means that the second signal is used only for starting the engine, while the first signal is always used throughout normal operation of the engine, regardless of the extent to which the speed of rotation of the engine is increased or decreased. A changeover from the first signal to the second signal is therefore performed only while the engine is stopped, in order to place the control means in a state that is favorable for starting the engine again.

In order to implement the method, it is possible to use the arrangement shown diagrammatically in FIG. 2. In this example, reference is made more specifically to the electrical machine being an alternator-starter, in particular one of the variable reluctance type, having a rotor with sixteen poles, an application in which the dispositions of the invention turn out to be particularly advantageous.

An alternator-starter 4 controlled by control means 5 is constrained to rotate (e.g. via a coupling shaft 6) with an internal combustion engine 7, itself provided with a toothed-wheel sensor 8 used for controlling the engine. After shaping in a circuit 9, the output signal from the sensor 8, referred to as a "first" signal, is applied to one input terminal $10_{e1}$ of a switch 10. The toothed-wheel sensor 8 is known to be reliable for speeds of rotation greater than the minimum measurement speed $V_M$.

Furthermore, angular position estimator means 11 receive electrical signals representative of the voltage and current electrical characteristics of the alternator-starter 4. These angular position estimator means 11 respond to said input signal (voltage, current) to generate an output signal referred to as the "second" signal that is representative of the angular position of the rotor of the alternator-starter. The second signal is applied to another input $10_{e2}$ of the switch 10. The position estimator means 11 are of a simplified type that is known to be reliable only at speeds below the maximum estimation speed $V_A$. The position estimator means may be constituted in the form of a calculator of simple structure, possibly being incorporated in the engine controlling software.

The switch 10 has an output terminal $10_s$ which is connected to an input of the control means 5 of the alternator-starter 4.

The output terminal $10_s$ is also connected to means for generating a signal representative of an estimated speed value, with its output being connected to a member 13 for actuating the moving contact of the switch 10. In this example, the speed estimator means 12 may be in the form of a calculator giving the estimated speed on the basis of rotation information (e.g. duration of a revolution) as determined from an electrical characteristic of the alternator-starter 4.

By means of this arrangement, the speed estimator means 12 are suitable for detecting the appropriate moment for actuating the switch 10 in such a manner that:

when, starting from zero speed, to speed of rotation is below the second above-mentioned threshold S2, the moving contact co-operates with input terminal $10_{e2}$ and it is the position estimator 11 that provides the rotor angular position signal that is applied to the control means of the alternator-starter;

when the speed of rotation exceeds the second above-mentioned threshold S2, the moving contact co-operates with input terminal $10_{e1}$ of the switch 10, and it is the signal issued by the toothed-wheel sensor 8 that is applied to the alternator-starter control means 5.

Given the respective relatively far-apart values for the thresholds S1 and S2 (e.g. S1=500 rpm; S2=700 rpm), the speed estimator means 12 do not need to be very accurate and can therefore be made in a way that is simple and of low cost.

Concerning the control of the switch 10, it is possible in a variant for it to be controlled not directly by the speed as estimated from an electrical characteristic of the alternator-starter, but from some other parameter, for example time: the switch 10 needs to act somewhere in the range S1 to S2, i.e. at a speed which is generally slower that the idling speed of the engine; in other words, changeover should occur while the engine is starting, as the engine accelerates from zero speed up to idling speed. If it is assumed that the duration of this starting stage is always approximately the same, then it is possible to assume that the engine will reach a speed lying in the range S1 to S2 after a length of time has elapsed that can be predetermined starting from when the engine is started.

The apparatus shown in FIG. 3 is based on this consideration, and instead of using speed estimator means 12 of the FIG. 2 apparatus, it implements timer means 14 that are triggered at the same time the engine 7 is started, by the contact circuit 15. Such timer means 14 may be implemented at lower cost than the speed estimator means 12. Timing then acts as the threshold S2 while the threshold S1 is omitted. In this case, the timer means can be reinitiated when the engine stops so as to enable a new timeout to begin next time the engine is started.

It should also be observed that the rotor position estimator means 11 may take account not only of the voltage and current electrical data concerning the electrical machine, but also of other parameters such as, in particular, temperature, so as to deliver information that is temperature compensated or that is compensated as a function of other parameters.

Naturally, the invention is not limited to the embodiments described and variants can be made thereto without going beyond the ambit of the invention as defined by the claims.

In particular, the thresholds S1 and S2 may coincide respectively with the speeds $V_M$ and $V_A$. Or the contrary, the thresholds S1 and S2 may coincide with each other and occupy some arbitrary point in the range $V_M$ to $V_A$.

The invention claimed is:

1. A method of detecting an angular position of a rotor of an electrical machine which is coupled in rotation without slip to an internal combustion engine that is fitted with a sensor delivering a first signal representative of the angular position of the engine at speeds of rotation that are greater than a minimum measurement speed, wherein on a basis of at least one characteristic of the electrical machine, a second signal is generated that is representative of an estimated angular rotor position for the electrical machine for speeds of rotation that are less than a maximum estimation speed, said estimation speed being equal to or greater than the minimum measurement speed;

as a function of an estimated speed of rotation, there is delivered to a control circuit configured to control the electrical machine, the second signal whenever the estimated speed of rotation is below a first threshold greater than or equal to the minimum measurement speed; or the first signal whenever the estimated speed of rotation is greater than a second threshold greater than or equal to the first threshold but less than or equal to the maximum estimation speed; and a changeover from the second signal to the first signal, and vice versa, is performed at an estimated speed of rotation lying between the first threshold and the second threshold.

2. A method according to claim 1, wherein during an increase in the speed of rotation while the second signal is being delivered, a changeover from the second signal to the first signal is performed when the estimated speed of rotation reaches the second threshold, and wherein, during a decrease in the speed of rotation while the first signal is being delivered, a changeover from the first signal to the second signal is performed when the estimated speed of rotation reaches the first threshold.

3. A method according to claim 2, wherein the second threshold is less than the idling speed of the internal combustion engine.

4. A method according to claim 1, wherein the estimated speed of rotation is determined on a basis of at least one electrical characteristic of the electrical machine.

5. A method according to claim 1, wherein the estimated speed of rotation is determined by a timer triggerable when the engine is started.

6. A method according to claim 1, wherein the first threshold is equal to 500 rpm and the second threshold is equal to 700 rpm.

7. A method for controlling an alternator, comprising:

determining a position of a rotor of the alternator using data obtained from a first data source;

determining a rotor position for the alternator using data obtained from a second data source; and switching between determining a rotor position using data obtained from the first data source and using data obtained from the second data source, wherein a point at which switching occurs is different when a speed of rotation is increasing than when the speed of rotation is decreasing.

8. The method of claim 7, wherein a point at which a switch is made is less than an idling speed of an engine to which the alternator is coupled.

9. A method of detecting an angular position of a rotor of an electrical machine, comprising:

determining a rotor position for the electrical machine using data obtained from a first data source;

determining a rotor position for the electrical machine using data obtained from a second data source;

switching between determining a rotor position using data obtained from the first data source and using data obtained from the second data source, a point at which switching occurs being different when a speed of rotation is increasing than when the speed of rotation is decreasing.

10. The method of claim 9, wherein switching occurs when a speed of rotation is decreasing only when the speed of rotation is zero.

11. The method of claim 9, wherein the switching occurs based on an estimate of the speed of rotation.

12. A vehicle comprising:

an engine;

an electrical machine coupled to the engine and comprising a rotor; and a control circuit configured to determine a position of a rotor of the electrical machine using data obtained from a first data source and determine a rotor position for the electrical machine using data obtained from a second data source, wherein the control-circuit is configured to switch between determining a rotor position using data obtained from the first data source and using data obtained from the second data source, a point at which switching occurs being different when a speed of rotation is increasing than when the speed of rotation is decreasing.

13. A vehicle comprising:

an engine;

an electrical machine coupled to the engine and comprising a rotor; and a control circuit configured to determine a position of a rotor of the electrical machine using data obtained from a first data source and determine a rotor position for the electrical machine using data obtained from a second data source, wherein the control circuit is configured to switch between determining a position of the rotor using data obtained from the first data source and using data obtained from the second data source, the control circuit configured to switch to using data obtained from the second data source when a predetermined amount of time has elapsed after the engine is started.

14. The vehicle of claim 13, wherein the control circuit is configured to switch to using data from the first data source when the engine is stopped.

* * * * *